Aug. 16, 1927.

C. JOBST 1,639,038

MOTOR BRAKE

Filed Oct. 6, 1924

Inventor
Conrad Jobst

Patented Aug. 16, 1927.

1,639,038

UNITED STATES PATENT OFFICE.

CONRAD JOBST, OF TOLEDO, OHIO, ASSIGNOR TO THE TOLEDO AUTOMATIC BRUSH MACHINE COMPANY, OF TOLEDO, OHIO, A CORPORATION OF OHIO.

MOTOR BRAKE.

Application filed October 6, 1924. Serial No. 741,995.

The invention relates to electric motors more particularly designed to be incorporated in a unit mechanism or machine. With such constructions the machine is controlled by the starting and stopping of the motor and it is desirable to provide means for quickly arresting movement when the current is broken. It is the object of the present invention to secure a simple construction of stop mechanism which may form a part of the motor unit and which functions to quickly arrest movement when the switch is open. To this end the invention consists in the construction as hereinafter set forth.

Figure 1:
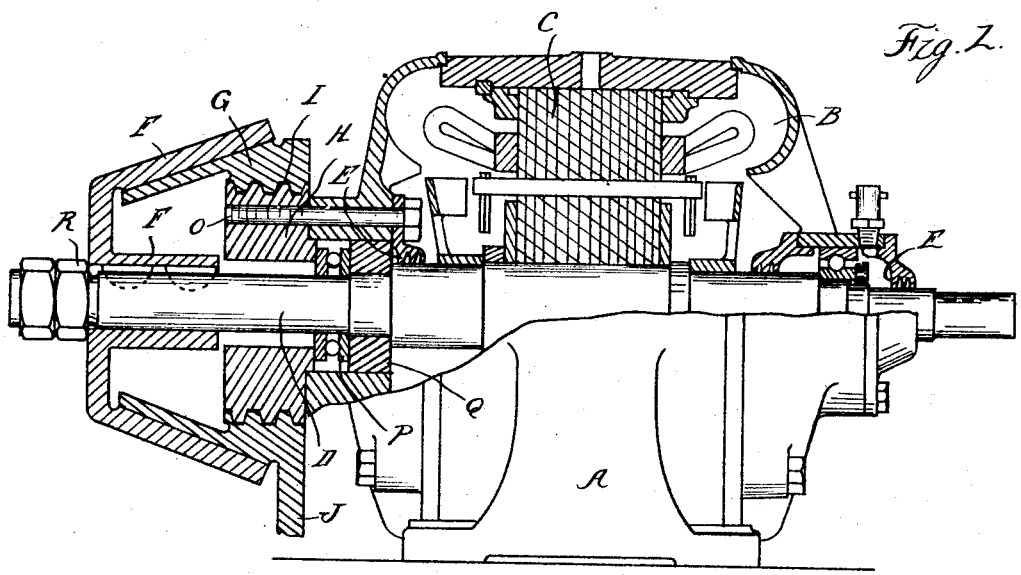
Figure 1 is a sectional elevation showing a motor unit provided with my improved stop mechanism.
Figure 2:
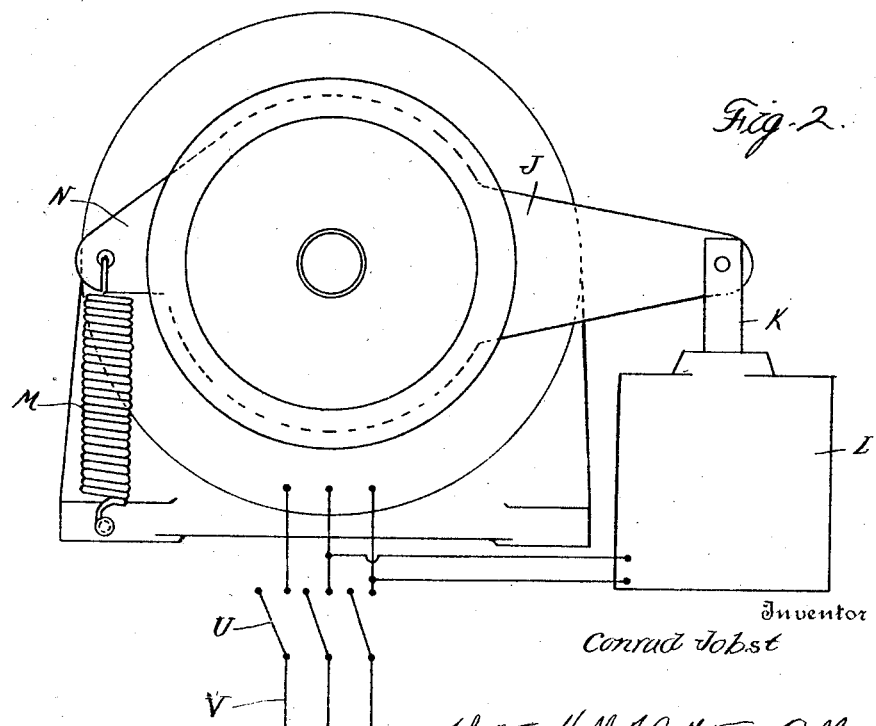
Figure 2 is an elevation at right angles to Figure 1 showing the stop mechanism.

The motor to which my improvements are applied may be of any suitable construction, such as shown in which A is the motor casing, B the field windings, C the armature or rotor, D the armature shaft, E the bearings in which said shaft is journaled. At one end of the casing there is mounted upon the shaft D a friction brake member F, preferably in the form of a coned cup. G is a cooperating brake member adapted to fit within the cup F and mounted upon a stationary bearing H on the motor casing. There is also provided means for adjusting the member G axially into and out of engagement with the cup F, preferably a threaded engagement between said member G and the bearing H, as indicated at I. Thus by slightly rotating the member G upon the bearing H, it will be moved into or out of contact with the member F to either brake or release the rotor. The rotation of the member G may be effected by an arm J connected at its outer end to the core member K of a solenoid L, which, when energized, actuates said arm in a direction to release the brake. Movement in the opposite direction may be effected by a spring M shown as attached to an oppositely projecting arm N on the member G and this spring may be suitably tensioned to apply just the required amount of pressure.

With the construction as described the solenoid L may be included in the motor circuit U so that the opening or closing of the controlling switch V will simultaneously energize or deenergize both the motor and the solenoid. Thus when the motor is started, the closing of the circuit will at once energize the solenoid, actuating the core K against the tension of the spring M, rocking the arm J and screwing the member G out of contact with the cooperating member F. This will instantaneously release the brake on the rotor and permit free rotation thereof. On the other hand, when the controlling switch is opened, the motor and the solenoid are simultaneously de-energized, whereupon the tension of the spring M will rotate the member G in the opposite direction, screwing it into contact with the member F and applying sufficient braking force to quickly arrest rotation.

This stop mechanism is exceedingly simple in construction, comprising only a few parts, easily manufactured and easily assembled. Thus the bearing H, which has the threaded periphery I, may be secured to the end of the motor casing by bolts O. This bearing may also take the end thrust on the rotor shaft produced by the forcing of the member G against the member F, and a ball or other anti-friction bearing P may be placed between the bearing H and a collar Q on the rotor shaft. The member F is provided with a hub F' keyed or otherwise secured to the rotor shaft and held in position by the lock nuts R.

What I claim as my invention is:—

1. The combination with an electric motor, of a friction brake member mounted on the rotor shaft, a co-operating brake member having such engagement with the motor casing that a rotary movement of said member imparts a longitudinal movement thereto, means for resiliently actuating said last mentioned brake member to rotate the same into engagement with the first mentioned brake member, and means operated by the closing of the motor circuit for reversely rotating said co-operating brake member to disengage the same.

2. The combination with an electric motor, of a cupped cone mounted on the rotor shaft, a cone member for frictionally engaging the inner surface of said cupped cone, a mounting between said last mentioned cone and the motor casing adapted to axially advance said cone upon a rotary movement thereof, means for rotating said last mentioned cone in one direction to frictionally engage the same with the cupped member and means for rotating said cone in the reverse direction to release such frictional engagement.

3. The combination with an electric motor, of a threaded bearing on the motor casing, a brake member engaging said threaded bearing, a cooperating brake member mounted on the rotor shaft, means for resiliently actuating said first-mentioned brake member to rotate the same into engagement with the cooperating member, and means operated by the closing of the motor circuit for reversely rotating said brake member to disengage the same from the cooperating member.

4. The combination with an electric motor, of a cone brake having one member thereof mounted on the rotor of said motor and the other member mounted on the motor casing to move longitudinally upon a rotative movement thereof, means for rotating said last mentioned brake member to press the same into frictional engagement with the first mentioned brake member, and means operating upon the closing of the motor circuit for rotating said last mentioned member in the reverse direction to release the brake.

5. The combination with an electric motor, of a threaded bearing mounted on the motor casing, a motor brake member engaging said threaded bearing, a cooperating cone brake member mounted on the rotor shaft, means for resiliently rotating a member on said threaded bearing to press the same into frictional engagement with the cooperating member, and means actuated upon the closing of the motor circuit for rotating said member in the reverse direction to release the frictional engagement.

6. The combination with an electric motor, of a cupped cone mounted on the rotor shaft, a cone member for frictionally engaging the inner surface of said cupped cone, a threaded member between the last-mentioned cone and the motor casing, means for rotating said threaded member in one direction to frictionally engage the cone member with the cupped member, and means for rotating said threaded member in the reverse direction to release such frictional engagement.

7. The combination of a rotatable friction brake member, a cooperating friction brake member, a rotatable member connected to said cooperating brake member and mounted to advance the same longitudinally by a rotary movement, electromagnetic means for rotating said rotatable member into one direction, and means operable to rotate said rotatable member in the opposite direction upon the release of said electromagnetic means.

8. The combination of a rotatable friction brake member, a co-operating friction brake member mounted to advance longitudinally by a rotary movement, resilient means for rotating said co-operating brake member in one direction, and electromagnetic means for rotating said co-operating brake member in the other direction.

In testimony whereof I affix my signature.

CONRAD JOBST.